(12) United States Patent
Abrahams et al.

(10) Patent No.: US 9,213,674 B2
(45) Date of Patent: *Dec. 15, 2015

(54) SHARING MEMORY AMONG MOBILE DEVICES

(71) Applicant: INTERNATIONAL BUSINESS MACHINES CORPORATION, Armonk, NY (US)

(72) Inventors: Faried Abrahams, Laytonsville, MD (US); Sandeep R. Patil, Pune (IN); Piyush Sarwal, Leawood, KS (US); Riyazahamad M. Shiraguppi, Pune (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,870

(22) Filed: Mar. 25, 2015

(65) Prior Publication Data

US 2015/0199297 A1 Jul. 16, 2015

Related U.S. Application Data

(63) Continuation of application No. 14/086,550, filed on Nov. 21, 2013, now Pat. No. 9,049,214.

(51) Int. Cl.
*G06F 15/167* (2006.01)
*H04L 29/08* (2006.01)
(Continued)

(52) U.S. Cl.
CPC ............ *G06F 15/167* (2013.01); *G06F 1/3287* (2013.01); *H04L 63/08* (2013.01); *H04L 67/1095* (2013.01); *H04L 67/1097* (2013.01)

(58) Field of Classification Search
CPC . H04L 67/1095; H04L 67/1097; H04L 63/08; G06F 15/167; G06F 1/3287
USPC ......... 709/203, 209, 211, 212, 214, 216, 226, 709/229, 248
See application file for complete search history.

(56) References Cited

U.S. PATENT DOCUMENTS 6,243,813 B1 6/2001 Kong
6,614,750 B2 9/2003 Weber et al.
(Continued)

FOREIGN PATENT DOCUMENTS

EP 1263199 B1 7/2008

OTHER PUBLICATIONS

A. Madan et al, "Securely Adopting Mobile Technology Innovations for Your Enterprise Using IBM Security Solutions", Redguide for Business Leaders, IBM Corp., 2013, pp. 1-42.
(Continued)

*Primary Examiner* — Michael Y Won
(74) *Attorney, Agent, or Firm* — John R. Pivnichny; Law Office of Jim Boice (57) ABSTRACT

A method, system, and/or computer program product enables the sharing of memory among mobile devices. Copies of a same hard key holder are installed in multiple mobile devices. The hard key holder controls memory sharing between a master mobile device and a slave mobile device. A memory appropriation request is sent from the master mobile device to the slave mobile device. In response to the slave mobile device receiving the memory appropriation request, an unused sector of the memory in the slave mobile device is reserved for use by the master mobile device. Upon storing of data sent from the master mobile device, a message is sent from the slave mobile device to the master mobile device describing how much room is still available for the master mobile device to use.

20 Claims, 4 Drawing Sheets

(51) Int. Cl.
*G06F 1/32* (2006.01)
*H04L 29/06* (2006.01)

(56) References Cited

U.S. PATENT DOCUMENTS

| | | | |
|---|---|---|---|
| 7,058,972 B2* | 6/2006 | Jussy et al. | 726/7 |
| 7,613,921 B2 | 11/2009 | Scarlata | |
| 7,779,070 B2* | 8/2010 | Bramoulle et al. | 709/203 |
| 7,788,663 B2* | 8/2010 | Illowsky et al. | 717/177 |
| 8,428,645 B2 | 4/2013 | Rao | |
| 8,442,542 B2 | 5/2013 | Brisebois et al. | |
| 8,467,770 B1 | 6/2013 | Ben Ayed | |
| 8,763,097 B2* | 6/2014 | Bhatnagar et al. | 726/5 |
| 2003/0105972 A1 | 6/2003 | Teng | |
| 2012/0084131 A1* | 4/2012 | Bergel et al. | 705/14.26 |
| 2013/0263242 A1* | 10/2013 | Jain et al. | 726/9 |
| 2015/0142885 A1* | 5/2015 | Abrahams et al. | 709/204 |

OTHER PUBLICATIONS

Anonymous, "Method to Enable Secure Messaging With Unsecure Mobile Device Targets", IPCOM000222833D, IP.com, Oct. 24, 2012, pp. 1-5.

IBM, "Provisioning Authentication to Mobile Devices", IPCOM000137367D, IP.com, Jun. 16, 2006, pp. 1-2.

S. Abudheen, "Mobile, USB May Replace Your Google Passwords", Mosaic Media Ventures Pvt Ltd., Techcircle.In, Jan. 22, 2013, pp. 1-3.

R. Lefebvre, "How to Share Your Contact Info Directly From Your iPhone [IOS Tips]" Cult of Mac, Cultomedia Corp, Sep. 12, 2013, pp. 1.

* cited by examiner

SHARING MEMORY AMONG MOBILE DEVICES

BACKGROUND

The present disclosure relates to the field of computers, and specifically to mobile computing devices. Still more particularly, the present disclosure relates to sharing storage space among mobile devices.

Mobile devices, such as smart phones, tablet computers, laptop computers, etc. often have limited storage capacity in their memory (e.g., random access memory—RAM) and storage devices (e.g., hard drive, flash drive, etc.). Thus, a mobile device may be unable to fully utilize its capabilities, due to this lack of storage capacity.

SUMMARY

A method, system, and/or computer program product enables the sharing of memory among mobile devices. Copies of a same hard key holder are installed in multiple mobile devices. The hard key holder controls memory sharing between a master mobile device and a slave mobile device. A memory appropriation request is sent from the master mobile device to the slave mobile device. In response to the slave mobile device receiving the memory appropriation request, an unused sector of the memory in the slave mobile device is reserved for use by the master mobile device. Upon storing of data sent from the master mobile device, a message is sent from the slave mobile device to the master mobile device describing how much room is still available for the master mobile device to use.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
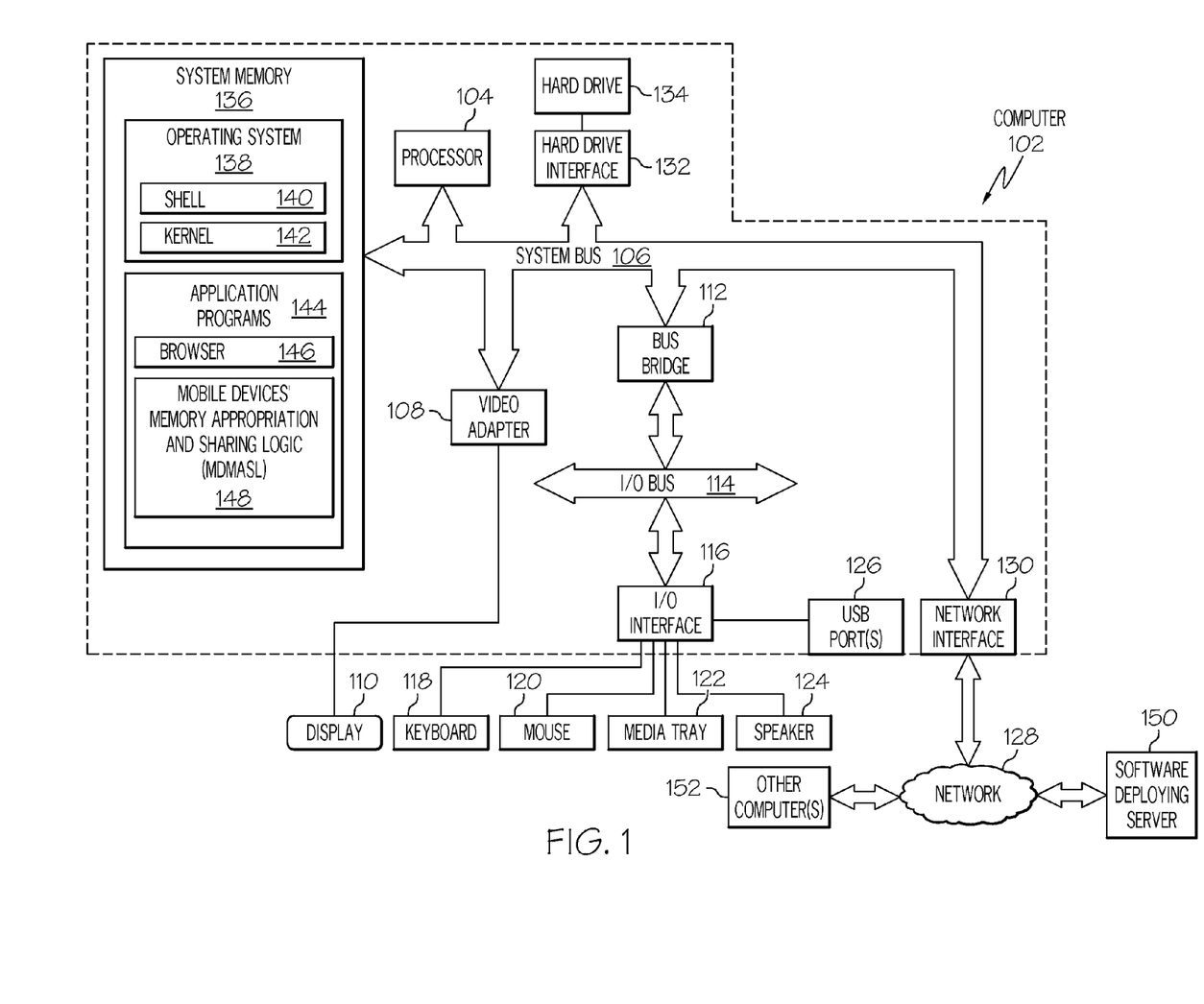
FIG. 1 depicts an exemplary system and network which may be used to implement the present invention.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as other computer(s) 152.

Application programs 144 in computer 102's system memory (as well as software deploying server 150's system memory) also include a mobile devices' memory appropriation and sharing logic (MDMASL) 148. MDMASL 148 includes code for implementing the processes described below, including those described in FIGS. 2-4. In one embodiment, computer 102 is able to download MDMASL 148 from software deploying server 150, including in an on-demand basis, wherein the code in MDMASL 148 is not downloaded until needed for execution. Note further that, in one embodiment of the present invention, software deploying server 150 performs all of the functions associated with the present invention (including execution of MDMASL 148), thus freeing computer 102 from having to use its own internal computing resources to execute MDMASL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
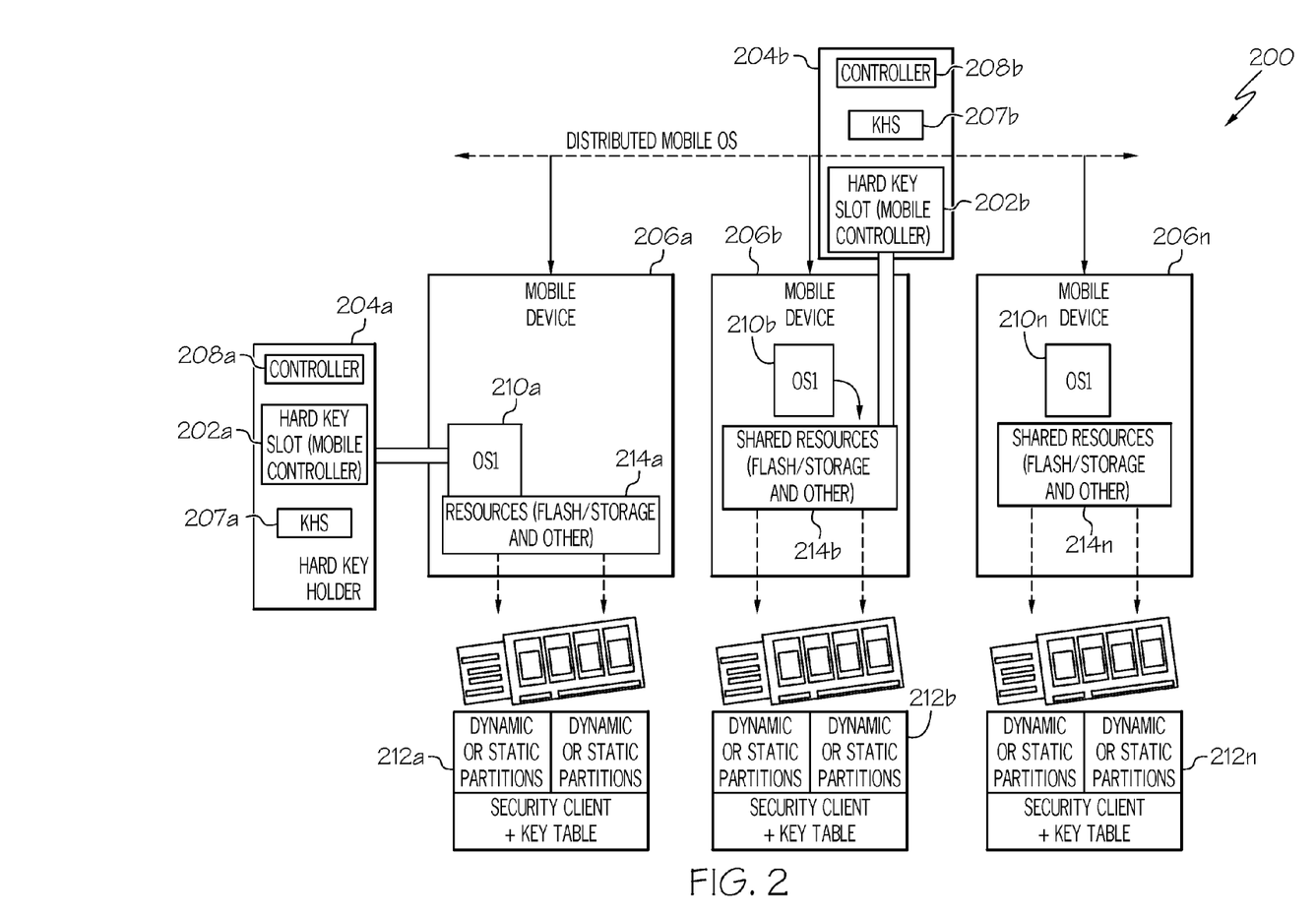
FIG. 2 illustrates a novel intelligent user driven security steward (IUDSS) system in accordance with one embodiment of the present invention.

With reference now to FIG. 2, a novel intelligent user driven security steward (IUDSS) system 200 in accordance with one embodiment of the present invention is presented. IUDSS 200 has three primary components. The first component of IUDSS 200 is a hard key slot within a hard key holder. As depicted in FIG. 2, hard key slot 202a is contained within a hard key holder shown as hard key holder 204a, which is inserted into mobile device 206a (from a set of mobile devices 206a-206n, where "n" is an integer). Examples of the mobile devices 206 include, but are not limited to, smart phones, personal digital assistants, laptop computers, tablet computers, etc. An exemplary mobile device 206a shown in FIG. 2 is computer 102 in FIG. 1, while exemplary mobile devices 206b and 206n are other computer(s) 152 in FIG. 1.

Hard key slot 202b (within another hard key holder 204b) is inserted into a slave mobile device, depicted as mobile device 206b. Each hard key slot 202 contains logic needed to generate/provide a hard key, which is a hardware security key that provides a security code/signature indicating that two mobile devices are authorized to share memory within one of the mobile devices. A hard key holder 204 (e.g., containing hard key slots 202) is allotted to every mobile user of the mobile devices 206a-206n, such that a duplicate copy of a same hard key holder 204 and its contents (e.g., hard key slot 202 and key hook substrate KHS 207) is inserted into each of the mobile devices 206a-206n. Note that, although not depicted for purposes of clarity, it is understood that all mobile devices in the set of mobile devices 206a-206n, including mobile device 206n, also has a duplicate copy of the hard key holder 204, which can be inserted into ("placed on hook") the mobile device 206.

The second component of IUDSS 200 is a key hook substrate (KHS). Thus, also within each of the hard key holders is a KHS 207, shown within hard key holder 204a as KHS 207a and within hard key holder 204b as KHS 207b. Each KHS 207 is capable of generating a unique software security key/code/identifier when the hard key holder 204 is inserted (placed on hook) within one or the mobile devices 206a-206n. The generation of these software keys by KHS 207 can be programmed dynamically or they can be static.

The third component of IUDSS 200 is an intelligent user driven security steward controller (IUDSSC), which is firmware depicted as controller 208a within hard key holder 204a and controller 208b within hard key holder 204b. When a hard key holder 204 is inserted into a mobile device 206, a distributed mobile operating system (depicted as OS1 210a-210n) incorporates the IUDSSC 208, thus enabling the mobile device 206 to generate a security client table (SCT) 212 (depicted as elements 212a-212n), which stores the security keys that are generated whenever a hard key holder 204 is inserted into a mobile device 206. These security keys are uniquely assigned to establish a secure relationship between two particular mobile devices 206. That is, each storage device 214 (depicted as resources 214a-214n) initially has memory locations, which are dynamically or statically partitioned. In response to a hard key holder 204 being inserted into a particular mobile device (e.g., mobile device 206b), an SCT 212 (e.g., SCL 212b) is updated to hold the newly-generated software keys. These software keys are required for a master mobile device (e.g., mobile device 206a) to appropriate and utilize memory resources found in a slave mobile device (e.g., mobile device 206b).

Thus, the IUDSSC works with the SCT, in order to match functionalities of resources, and to enable the distribution of a distributed mobile OS, in order to leverage the resources used to store data in shared environment of mobile devices. That is, when the hard key slot/holder is placed on hook, relevant soft keys get generated. The IUDSSC also receives the generated soft key, retrieves the keys from the SCT, and then compares the two keys. This allows access to the memory/storage resources in the slave mobile devices only when the keys match (assuming that there has been a key flow in which the software/hardware keys are integral with the slave/master mobile devices). In one embodiment, when the hard key is removed from a mobile device, the key generation gets stopped. At this point, the IUDSSC stops access to the shared resources, thus ensuring external hard key enabled security.

Figure 3:
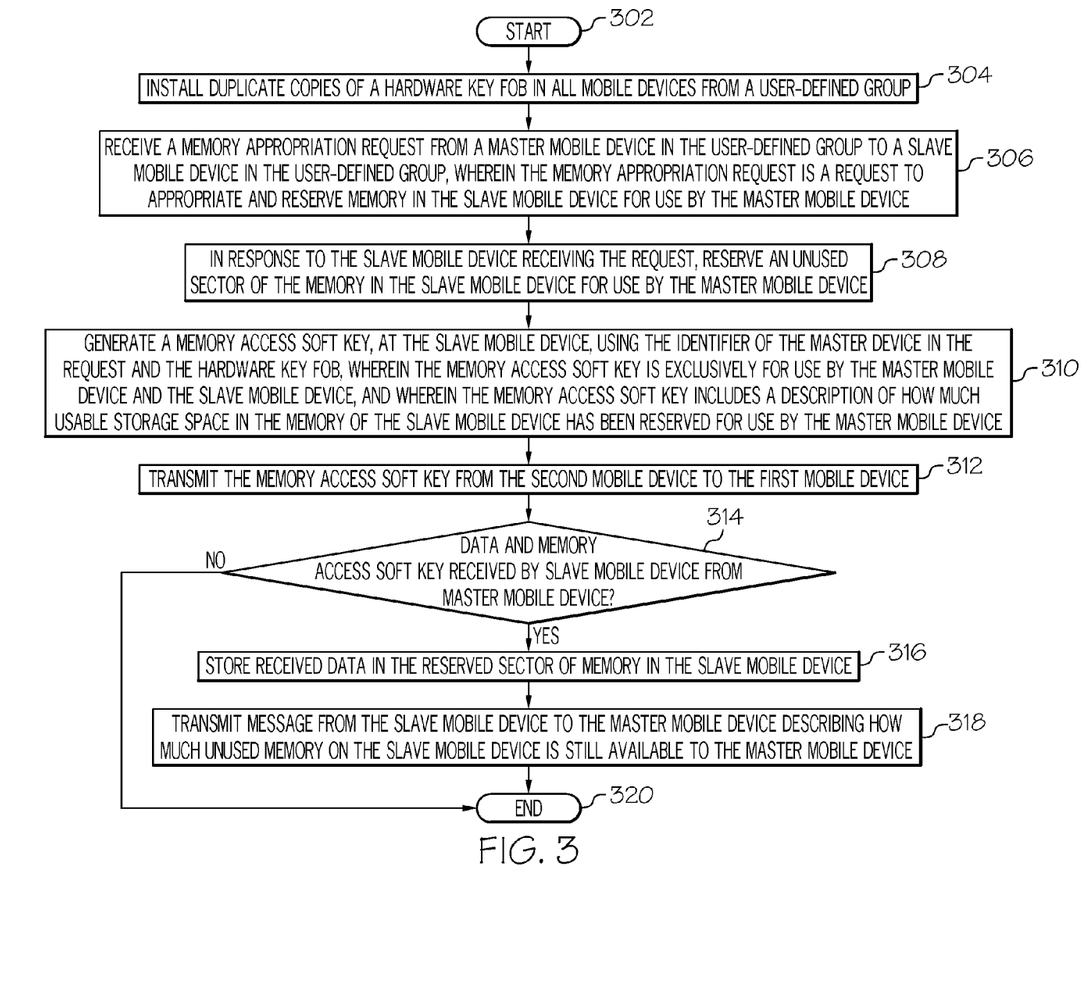
FIG. 3 is a high level flow chart of one or more exemplary steps taken by one or more processors to share memory among mobile devices.

With reference now to FIG. 3, a high level flow chart of one or more exemplary steps taken by one or more processors to enable the sharing of memory among mobile devices is presented. After initiator block 302, duplicate copies of a hardware key fob are installed in all mobile devices from a user-defined group of mobile devices (block 304). Each of these duplicate copies of the hardware key fob contains a hard key slot (e.g., elements 202a-202b shown in FIG. 2). Associated with each hard key slot is logic that, in response to the hard key slot being inserted into a mobile device (e.g., any of the mobile devices 206 shown in FIG. 2), provides that mobile device access to a hard key contained within the hard key holder (e.g., elements 204a-204b shown in FIG. 2). This hard key is a hardware security key that provides a security code/signature indicating that two mobile devices are authorized to share memory within one of the mobile devices. The hard key is also used to generate a soft key that, together with the hard key, is used to verify an identity and authorization of a master mobile device (e.g., mobile device 206a shown in FIG. 2) to appropriate and use memory from a slave mobile device (e.g., mobile device 206b shown in FIG. 2). As described herein, the master mobile device and the slave mobile device are members of the user-defined group of mobile devices.

As described in block 306 in FIG. 3, a memory appropriation request from the master mobile device is received by a first slave mobile device from the user-defined group of mobile devices. This memory appropriation request is a request to appropriate and reserve memory in the first slave mobile device for use by the master mobile device. In one embodiment, the memory appropriation request includes an identifier of the master mobile device that is making the request. For example, slave mobile device 206b in FIG. 2 may receive a message from master mobile device 206a, requesting that the slave mobile device 206b reserve memory (in one embodiment, a specific amount of memory, such as 5 Gbytes) to be used by master mobile device 206a. In one embodiment, this request (either for an indefinite amount of a specific amount of storage space) is also accompanied by an indication of 1) a start time at which the storage space will be needed, 2) how long the storage space will be needed (i.e., the end time at which the storage space will no longer be needed, assuming that the need is not permanent), 3) what type of data (e.g., text, video, sensitive, etc.) will be stored in the requested/reserved/appropriated storage space, and/or 4) a predication of how frequently the master mobile device will be accessing (either pushing data into or pulling data out of) the requested/reserved/appropriated storage space.

As described in block 308, in response to the first slave mobile device receiving the request to reserve storage space within the first slave mobile device, the first slave mobile device reserves an unused sector of the memory in the first slave mobile device for the exclusive use of the master mobile device. As depicted in block 310, the first slave mobile device then generates a memory access soft key using 1) the identifier of the master mobile device found in the request and 2) the hard key found in the hard key fob that has been inserted into the first slave mobile device. This memory access soft key is for the exclusive use of the master mobile device. That is, in one embodiment this memory access soft key identifies that particular (master) mobile device as the only mobile device that can use the appropriated memory in the first slave mobile device. In one embodiment, the memory access soft key also includes a description of how much usable storage space in the memory of the first slave mobile device is available (i.e., is not being used by the first mobile device and/or can be made available by erasing data, etc.) and, from that available storage space, how much is being reserved for the master mobile device to use.

As described in block 312, the memory access soft key is transmitted from the first slave mobile device to the master mobile device. If the first slave mobile device then receives this memory access soft key back from the master mobile device (query block 314), along with data that the master mobile device wants to store within the first slave mobile device, then the received data from the master mobile device is stored in a reserved sector of memory in the first slave mobile device (block 316).

As described in block 318, in one embodiment a message is transmitted from the first slave mobile device to the master mobile device. This message describes how much unused memory on the first slave mobile device is still available to the master mobile device after the received data is stored in the first slave mobile device. For example, assume that the master mobile device simply requested that the first mobile device store 4 Gbytes of data. By simply returning the memory access soft key to the master mobile device, the first slave mobile device is indicating that it is willing/able to store 4 Gbytes of data. The return message described in block 318 indicates not only that the received 4 Gbytes of data have been stored (and their address/location), but also indicates how much more storage space (e.g., another 2 Gbytes) the first slave mobile device is willing to let the master mobile device use (if any). In one embodiment, the process ends at terminator block 320.

As depicted in FIG. 2, the master mobile device (e.g., mobile device 206a) may have multiple choices as to which slave mobile device will its storage space appropriated (e.g., mobile device 206b or mobile device 206n). That is, the master mobile device may 1) choose a specific one or more slave mobile device(s) initially, and/or 2) determine how to respond if an initially chosen slave mobile device should no longer be adequate (e.g., it is turned off). The following embodiments address these issues.

Thus, in one embodiment of the present invention, the master mobile device detects a request to power down the first slave mobile device. This request may be a message from the first slave mobile device to the master mobile device, or it may be an internal request within the first slave mobile device that the master mobile device (or another computer) is monitoring (i.e., is monitoring the internal message traffic within the first slave mobile device). If the first slave mobile device powers down (i.e., is turned off), then the data stored therein is unavailable to the master mobile device. Furthermore, if the data was stored in volatile memory (e.g., random access memory—RAM) within the first slave mobile device, the stored data will be lost. In order to avoid either scenario, prior to powering down the first slave mobile device, an instruction is transmitted to a second slave mobile device to store the received data in the second slave mobile device. That is, this instruction contains both 1) the data that was stored in the first slave mobile device, 2) an instruction to store this data in the second slave mobile device, and 3) directions to the second slave mobile device to generate a new memory access soft key that enables the master mobile device to access the received data. If the second slave mobile device is unable to accommodate the directive to store the received data (e.g., it has an inadequate amount of available storage space, etc.), then the master mobile device, the first slave mobile device, the second slave mobile device, and/or another monitoring computer will transmit the received data to either another mobile device or a fixed server. In one embodiment, the received data is simply sent to a fixed server that is known to the first slave mobile device as having storage space that is orders of magnitude larger than what is needed for the received data (e.g., the fixed server has access to a large cloud of memory resources). Assuming that the second slave mobile device is handling this matter (i.e., sending the data to the fixed server for storage), then the second slave mobile device transmits a message to the master mobile device, identifying an address of the fixed server and a description of the received data that is now stored on the fixed server.

In one embodiment in which the user-defined group of mobile devices comprises the first slave mobile device and a second slave mobile device, a determination is made as to when the first slave mobile device will next be powered down and the second slave mobile device will next be powered down. That is, historical data about the operating schedules of the two slave mobile devices may reveal that the first slave mobile device will likely be turned off within the next day, while the second slave mobile device will likely remain turned on until next week. A determination is made as to how long the master mobile device will need to access/use the data that is to be stored on a slave mobile device. If that data will be needed for the next three days, then the master slave mobile device will choose the second slave mobile device to store its data, since this data would be unavailable after one day if stored on the first slave mobile device.

In one embodiment in which the user-defined group of mobile devices comprises the first slave mobile device and a second slave mobile device, assume that neither the first slave mobile device nor the second slave mobile device has sufficient storage space to store the data from the master mobile device when the memory appropriation request is received from the master mobile device. Thus, in this embodiment, an identification is made (by the slave mobile device(s), the master mobile device, or by another monitoring computer system) of a first set of files stored in the first slave mobile device and a second set of files in the second slave mobile device. A determination is made regarding what level of detriment (i.e., a "first level of detriment") will occur to the first slave mobile device if the first set of files is deleted to make room for the data from the master mobile device, as compared to the level of detriment (i.e., a "second level of detriment") that will occur to the second slave mobile device if the second set of files are deleted to make room for the data from the master mobile device. In response to the first level of detriment being greater than the second level of detriment, then the data is stored in the second slave mobile device. For example, assume that the first slave mobile device is storing data that controls its input/output ports, identifies which peripheral devices are attached, etc. Now assume that the second slave mobile device is storing cookies, which can be used by another device to identify a browsing history of the user of the second slave mobile device. A predetermination can be made that first data that controls its input/output ports is more critical to the operation of a mobile device than second data about cookies. Thus, a similar predetermination is made (e.g., by the slave mobile devices themselves) that deleting the first data would be more detrimental that deleting the second data, when considering the overall operation of the slave mobile devices.

In one embodiment of the present invention in which the user-defined group of mobile devices comprises the first slave mobile device and a second slave mobile device, assume that the first slave mobile device is coupled to the master mobile device via a first wide area network, and that the second slave mobile device is coupled to the master mobile device via a second wide area network, where the first wide area network is faster than the second wide area network. For example, consider FIG. 4, in which a topography 400 has different types of slave mobile devices 402a-402n (where "n" is an integer") can be coupled to a master mobile device 404 via similar or disparate types of networks 406a-406n. That is, assume that network 406a is a Wi-Fi enabled Internet network, which has a bandwidth of 54 Mbps (54 million bits per second). Assume further that network 406b is a cell phone network, which has a bandwidth of only 22 Mpbs (upstream). Thus, network 406a is faster than network 406b. Assume that the data from the master mobile device has been stored in both the first slave mobile device and the second slave mobile device (e.g., 402a and 402b in FIG. 4). Assume also that the master mobile device has first attempted to retrieve the stored data (that the master mobile device sent out earlier for storage) from the first slave mobile device via the faster first wide area network (e.g., 406a in FIG. 4). If this data retrieval attempt fails (i.e., generates a total failure message due to a permanent problem with the network/slave mobile device, or else simply takes too long due to a transient problem with the first wide area network, the first slave mobile device, etc.), then the master mobile device will retrieve the needed data from the second slave mobile device via the second wide area network (which was initially slower than the first wide area network before the recent problems to the system).

Figure 4:
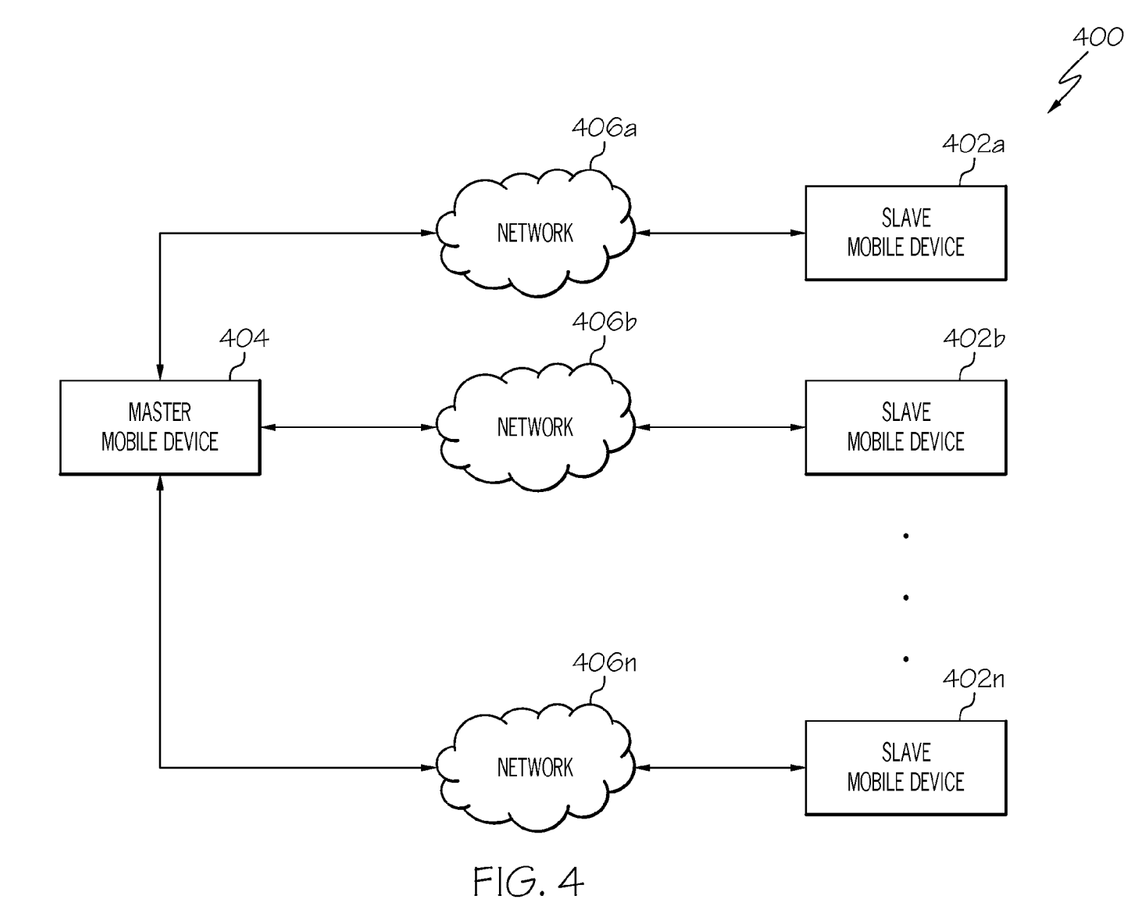
FIG. 4 depicts exemplary different types of slave mobile devices coupled to a master mobile device via similar or disparate types of networks.

Note that an exemplary master mobile device 404 in FIG. 4 is computer 102 in FIG. 1, while exemplary slave mobile devices 402a-402n in FIG. 4 are other computer(s) 152 in FIG. 1.

In one embodiment in which the user-defined group of mobile devices comprises the first slave mobile device and a second slave mobile device, assume that the first slave mobile device is coupled to the master mobile device via a personal area network, and the second slave mobile device is coupled to the master mobile device via a wide area network. For example, in FIG. 4, assume that wireless personal area network (WPAN), such as a short-range wireless network that complies with the IEEE 802.15 or similar standard(s). A WPAN or other personal area network is limited in range. That is, if two devices are not in close enough proximity to one another (e.g., within 10 meters of one another), then those two devices are not able to be communicatively coupled (i.e., cannot send messages back and forth to one another).

For example, assume that network 406a is a WPAN that couples slave mobile device 402a to master mobile device 404 (assuming that they are within 10 meters of one another), while network 406b is the Internet, which is always able to connect the slave mobile device 402b to the master mobile device 404. Assume also that both the slave mobile device 402a and slave mobile device 402b have a copy of data that was sent out from the master mobile device 404 for external storage. If the master mobile device 404 is communicatively coupled to the slave mobile device 402a (i.e., the two devices are within 10 meters of one another, and thus can use WPAN network 406a), then the master mobile device will retrieve the stored data from the slave mobile device 402a. This may be a first choice of a user of the master mobile device 404, since the two users (of the master mobile device 404 and the slave mobile device 402a) are able to see/talk with one another, thus allowing them to know what the master mobile device 404 is doing. However, if there are no slave mobile devices within range of the WPAN, then the master mobile device will retrieve the previously stored data from the second slave mobile device 402b. Although the data bandwidth rate is likely to be faster using the second slave mobile device 402b, use of the second slave mobile device 402b poses various problems that the master slave mobile device 404 may like to avoid. For example, using the second slave mobile device 402b may cause the user of the second slave mobile device 402b to pay for additional data transmission to her cell phone service provider. Similarly, the second slave mobile device 402b may suffer some performance degradation while retrieving/transmitting the master mobile device's data, which may be unfair to do without letting the user of the second slave mobile device 402b know what is going on.

As described herein, the presently presented invention presents a "user driven security model" that is superior to systems known in the prior art. The present invention enables users to gain confidence when sharing data, by establishing a secure relationship that is also within the control of the slave mobile devices (due to the requisite use of the hard key holder as described herein).

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described embodiments of the invention of the present application in detail and by reference to illustrative embodiments thereof, it will be apparent that modifications and variations are possible without departing from the scope of the invention defined in the appended claims.

What is claimed is:

1. A method of sharing memory among mobile devices, wherein duplicate copies of a hard key holder have been installed in multiple mobile devices, wherein each said hard key holder comprises a hard key used to generate a soft key, wherein the hard key and the soft key are used to verify an identity and authorization of a master mobile device to appropriate and use memory from a slave mobile device, and wherein the method comprises:

receiving a memory appropriation request from the master mobile device by a first slave mobile device, wherein the memory appropriation request is a request to appropriate and reserve memory in the first slave mobile device for use by the master mobile device, wherein the memory appropriation request comprises an identifier of the master mobile device;

in response to the first slave mobile device receiving the request, reserving an unused sector of the memory in the first slave mobile device for use by the master mobile device;

generating a memory access soft key, at the first slave mobile device, using the identifier of the master mobile device in the request and the hard key holder, wherein the memory access soft key comprises a description of how much usable storage space in the memory of the first slave mobile device is available and has been reserved for the master mobile device to use;

transmitting the memory access soft key from the first slave mobile device to the master mobile device;

receiving the memory access soft key from the master mobile device at the first slave mobile device; and     in response to data and the memory access soft key being received by the first slave mobile device from the master mobile device, storing received data from the master mobile device in a reserved sector of memory in the first slave mobile device.

2. The method of claim 1, further comprising:

transmitting a message from the first slave mobile device to the master mobile device describing how much unused memory on the first slave mobile device is still available to the master mobile device after the received data is stored in the first slave mobile device.

3. The method of claim 1, further comprising:

detecting a request to power down the first slave mobile device; and     prior to powering down the first slave mobile device, transmitting an instruction to a second slave mobile device to store the received data in the second slave mobile device.

4. The method of claim 3, further comprising:

in response to the second slave mobile device having an inadequate amount of available storage capacity to store the received data, transmitting the received data to a fixed server for storage therein; and     transmitting a message from the second slave mobile device to the master mobile device, wherein the message comprises an address of the fixed server and a description of the received data.

5. The method of claim 1, further comprising:

determining when the first slave mobile device will next be powered down;

determining when a second slave mobile device will next be powered down;

determining a specific time after which the master mobile device will no longer need to use the data; and     in response to determining that the first slave mobile device will next be powered down before the specific time and that the second slave mobile device will next be powered down after the specific time, moving the received data from the first slave mobile device to the second slave mobile device.

6. The method of claim 1, wherein neither the first slave mobile device nor a second slave mobile device has sufficient storage space to store the data from the master mobile device when the memory appropriation request is received from the master mobile device, and wherein the method further comprises:

identifying a first set of files stored in the first slave mobile device and a second set of files in the second slave mobile device;

determining a first level of detriment that will occur to the first slave mobile device if the first set of files is deleted to make room for the data from the master mobile device;

determining a second level of detriment that will occur to the second slave mobile device if the second set of files are deleted to make room for the data from the master mobile device; and     in response to the first level of detriment being greater than the second level of detriment, storing the data in the second slave mobile device.

7. The method of claim 1, wherein the first slave mobile device is coupled to the master mobile device via a first wide area network, wherein a second slave mobile device is coupled to the master mobile device via a second wide area network, wherein the first wide area network is faster than the second wide area network, and wherein the method further comprises:

storing the received data in the second slave mobile device;

attempting, by the master mobile device, to retrieve the received data from the first slave mobile device via the first wide area network; and     in response to a failure in said attempting to retrieve the received data from the first slave mobile device, retrieving, by the master mobile device, the received data from the second slave mobile device via the second wide area network.

8. The method of claim 1, wherein the first slave mobile device is coupled to the master mobile device via a personal area network, wherein a second slave mobile device is coupled to the master mobile device via a wide area network, and wherein the method further comprises:

storing the received data in the second slave mobile device;

determining whether the master mobile device and the first slave mobile device are communicatively coupled;

in response to determining that the master mobile device and the first slave mobile device are communicatively coupled, retrieving, by the master mobile device, the received data from the first slave mobile device via the personal area network; and     in response to determining that the master mobile device and the first slave mobile device are not communicatively coupled, retrieving, by the master mobile device, the received data from the second slave mobile device via the wide area network.

9. A computer program product for sharing memory among mobile devices, wherein duplicate copies of a hard key holder have been installed in multiple mobile devices, wherein each said hard key holder comprises a hard key used to generate a soft key, wherein the hard key and the soft key are used to verify an identity and authorization of a master mobile device to appropriate and use memory from a slave mobile device, the computer program product comprising a non-transitory computer readable storage medium having program code embodied therewith, the program code readable and executable by a processor to perform a method comprising:
- receiving a memory appropriation request from the master mobile device by a first slave mobile device, wherein the memory appropriation request is a request to appropriate and reserve memory in the first slave mobile device for use by the master mobile device, and wherein the memory appropriation request comprises an identifier of the master mobile device;
- in response to the first slave mobile device receiving the request, reserving an unused sector of the memory in the first slave mobile device for use by the master mobile device;
- generating a memory access soft key, at the first slave mobile device, using the identifier of the master mobile device in the request and the hard key holder, wherein the memory access soft key comprises a description of how much usable storage space in the memory of the first slave mobile device is available and has been reserved for the master mobile device to use;
- transmitting the memory access soft key from the first slave mobile device to the master mobile device;
- transmitting the memory access soft key from the master mobile device back to the first slave mobile device;
- in response to data and the memory access soft key being received by the first slave mobile device from the master mobile device, storing received data from the master mobile device in a reserved sector of memory in the first slave mobile device; and
- transmitting a first message from the first slave mobile device to the master mobile device describing how much unused memory on the first slave mobile device is still available to the master mobile device after the received data is stored in the first slave mobile device.

10. The computer program product of claim 9, wherein the method further comprises:
- detecting a request to power down the first slave mobile device; and
- prior to powering down the first slave mobile device, transmitting an instruction to a second slave mobile device to store the received data in the second slave mobile device.

11. The computer program product of claim 10, wherein the method further comprises:
- in response to the second slave mobile device having an inadequate amount of available storage capacity to store the received data, transmitting the received data to a fixed server for storage therein; and
- transmitting a second message from the second slave mobile device to the master mobile device, wherein the second message comprises an address of the fixed server and a description of the received data.

12. The computer program product of claim 9, wherein the method further comprises:
- determining when the first slave mobile device will next be powered down;
- determining when a second slave mobile device will next be powered down;
- determining a specific time after which the master mobile device will no longer need to use the data; and
- in response to determining that the first slave mobile device will next be powered down before the specific time and that the second slave mobile device will next be powered down after the specific time, moving the received data from the first slave mobile device to the second slave mobile device.

13. The computer program product of claim 9, wherein the first slave mobile device is coupled to the master mobile device via a first wide area network, wherein a second slave mobile device is coupled to the master mobile device via a second wide area network, wherein the first wide area network is faster than the second wide area network, and wherein the method further comprises:
- storing the received data in the second slave mobile device;
- attempting, by the master mobile device, to retrieve the received data from the first slave mobile device via the first wide area network; and
- in response to a failure in said attempting to retrieve the received data from the first slave mobile device, retrieving, by the master mobile device, the received data from the second slave mobile device via the second wide area network.

14. The computer program product of claim 9, wherein the first slave mobile device is coupled to the master mobile device via a personal area network, wherein a second slave mobile device is coupled to the master mobile device via a wide area network, and wherein the method further comprises:
- storing the received data in the second slave mobile device;
- determining whether the master mobile device and the first slave mobile device are communicatively coupled;
- in response to determining that the master mobile device and the first slave mobile device are communicatively coupled, retrieving, by the master mobile device, the received data from the first slave mobile device via the personal area network; and
- in response to determining that the master mobile device and the first slave mobile device are not communicatively coupled, retrieving, by the master mobile device, the received data from the second slave mobile device via the wide area network.

15. A computer system comprising:
- a processor, a computer readable memory, and a computer readable storage medium;
- first program instructions to install a hard key holder in a master mobile device, wherein duplicate copies of the hard key holder have been installed in multiple mobile devices, wherein each said hard key holder comprises a hard key used to generate a soft key, wherein the hard key and the soft key are used to verify an identity and authorization of a master mobile device to appropriate and use memory from a slave mobile device;
- second program instructions to transmit a memory appropriation request from the master mobile device to a first slave mobile device, wherein the memory appropriation request is a request to appropriate and reserve memory in the first slave mobile device for use by the master mobile device, and wherein the memory appropriation request comprises an identifier of the master mobile device;
- third program instructions to, in response to the first slave mobile device receiving the request, direct the first slave mobile device to reserve an unused sector of the memory in the first slave mobile device for use by the master mobile device;
- fourth program instructions to direct the first slave mobile device to generate a memory access soft key using the identifier of the master mobile device in the request and the hard key holder, wherein the memory access soft key comprises a description of how much usable storage space in the memory of the first slave mobile device is available and has been reserved for the master mobile device to use;
- fifth program instructions to direct the first slave mobile device to transmit the memory access soft key from the first slave mobile device to the master mobile device;

sixth program instructions to transmit the memory access soft key from the master mobile device back to the first slave mobile device;

seventh program instructions to, in response to data and the memory access soft key being received by the first slave mobile device from the master mobile device, direct the first slave mobile device to store received data from the master mobile device in a reserved sector of memory in the first slave mobile device; and eighth program instructions to receive a message from the first slave mobile device to the master mobile device describing how much unused memory on the first slave mobile device is still available to the master mobile device after the received data is stored in the first slave mobile device; and wherein the first, second, third, fourth, fifth, sixth, seventh, and eighth program instructions are stored on the computer readable storage medium for execution by the processor via the computer readable memory.

16. The computer system of claim 15, further comprising:
ninth program instructions to detect a request to power down the first slave mobile device; and tenth program instructions to, prior to powering down the first slave mobile device, transmit an instruction to a second slave mobile device to store the received data in the second slave mobile device; and wherein the ninth and tenth program instructions are stored on the computer readable storage medium for execution by the processor via the computer readable memory.

17. The computer system of claim 15, wherein the computer system further comprises:
ninth program instructions to determine when the first slave mobile device will next be powered down;

tenth program instructions to determine when a second slave mobile device will next be powered down;

eleventh program instructions to determine a specific time after which the master mobile device will no longer need to use the data; and twelfth program instructions to, in response to determining that the first slave mobile device will next be powered down before the specific time and that the second slave mobile device will next be powered down after the specific time, move the received data from the first slave mobile device to the second slave mobile device; and wherein the ninth, tenth, eleventh, and twelfth program instructions are stored on the computer readable storage medium for execution by the processor via the computer readable memory.

18. The computer system of claim 15, wherein neither the first slave mobile device nor a second slave mobile device has sufficient storage space to store the data from the master mobile device when the memory appropriation request is received from the master mobile device, and wherein the computer system further comprises:
ninth program instructions to identify a first set of files stored in the first slave mobile device and a second set of files in the second slave mobile device;

tenth program instructions to determine a first level of detriment that will occur to the first slave mobile device if the first set of files is deleted to make room for the data from the master mobile device;

eleventh program instructions to determine a second level of detriment that will occur to the second slave mobile device if the second set of files are deleted to make room for the data from the master mobile device; and twelfth program instructions to, in response to the first level of detriment being greater than the second level of detriment, store the data in the second slave mobile device; and wherein the ninth, tenth, eleventh, and twelfth program instructions are stored on the computer readable storage medium for execution by the processor via the computer readable memory.

19. The computer system of claim 15, wherein the first slave mobile device is coupled to the master mobile device via a first wide area network, wherein a second slave mobile device is coupled to the master mobile device via a second wide area network, wherein the first wide area network is faster than the second wide area network, and wherein the computer system further comprises:
ninth program instructions to store the received data in the second slave mobile device;

tenth program instructions to attempt, by the master mobile device, to retrieve the received data from the first slave mobile device via the first wide area network; and eleventh program instructions to, in response to a failure in said attempting to retrieve the received data from the first slave mobile device, retrieve, by the master mobile device, the received data from the second slave mobile device via the second wide area network; and wherein the ninth, tenth, and eleventh program instructions are stored on the computer readable storage medium for execution by the processor via the computer readable memory.

20. The computer system of claim 15, wherein the first slave mobile device is coupled to the master mobile device via a personal area network, wherein a second slave mobile device is coupled to the master mobile device via a wide area network, and wherein the computer system further comprises:
ninth program instructions to store the received data in the second slave mobile device;

tenth program instructions to determine whether the master mobile device and the first slave mobile device are communicatively coupled;

eleventh program instructions to, in response to determining that the master mobile device and the first slave mobile device are communicatively coupled, retrieve, by the master mobile device, the received data from the first slave mobile device via the personal area network; and twelfth program instructions to, in response to determining that the master mobile device and the first slave mobile device are not communicatively coupled, retrieve, by the master mobile device, the received data from the second slave mobile device via the wide area network; and wherein the ninth, tenth, eleventh, and twelfth program instructions are stored on the computer readable storage medium for execution by the processor via the computer readable memory.

* * * * *